US008390600B2

(12) United States Patent
Cabrera Cordon et al.

(10) Patent No.: US 8,390,600 B2
(45) Date of Patent: Mar. 5, 2013

(54) INTERACTIVE DISPLAY SYSTEM WITH CONTACT GEOMETRY INTERFACE

(75) Inventors: Luis Eduardo Cabrera Cordon, Bothell, WA (US); Robert Levy, Seattle, WA (US); Sundaram Ramani, Redmond, WA (US); Daniel Wigdor, Seattle, WA (US); Joyce Wu, Redmond, WA (US); Ian Middleton, Bellevue, WA (US); Paul Armistead Hoover, Kirkland, WA (US); Sarat Subramaniam, Bellevue, WA (US); Carlos Pessoa, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 12/617,951

(22) Filed: Nov. 13, 2009

(65) Prior Publication Data

US 2011/0115745 A1    May 19, 2011

(51) Int. Cl.
*G06F 3/042* (2006.01)
(52) U.S. Cl. .................................... 345/175; 345/173
(58) Field of Classification Search .................. None
See application file for complete search history.

(56) References Cited

U.S. PATENT DOCUMENTS

| 6,954,197 | B2 | 10/2005 | Morrison et al. | |
|---|---|---|---|---|
| 2006/0036944 | A1 | 2/2006 | Wilson | |
| 2008/0036743 | A1* | 2/2008 | Westerman et al. | 345/173 |
| 2008/0316145 | A1 | 12/2008 | May | |
| 2009/0135162 | A1 | 5/2009 | Van De Wijdeven et al. | |
| 2009/0143141 | A1 | 6/2009 | Wells et al. | |
| 2010/0079405 | A1* | 4/2010 | Bernstein | 345/174 |

FOREIGN PATENT DOCUMENTS

| EP | 1360642 B1 | 11/2003 |
|---|---|---|
| WO | 2008032270 A2 | 3/2008 |

OTHER PUBLICATIONS

Cao, et al., "ShapeTouch: Leveraging Contact Shape on Interactive Surfaces", Retrieved at <<http://www.cs.toronto.edu/~caox/tabletop2008_shapetouch.pdf>>, 2008 IEEE International Workshop on Horizontal Interactive Human Computer System (TABLETOP), pp. 139-146.

* cited by examiner

*Primary Examiner* — Adam R Giesy
(74) *Attorney, Agent, or Firm* — Alleman Hall McCoy Russell & Tuttle LLP

(57) ABSTRACT

An interactive display system with a contact geometry interface is disclosed. The interactive display system may include a multi-touch display, a touch detection system configured to detect a touch input on the multi-touch display and to generate contact geometry for a contact region of the touch input, and an application programming interface executed on a processor of the interactive display system. The application programming interface may be configured to receive the contact geometry and to send the contact geometry to a requesting application program for application-level processing. Further, the application programming interface may be configured to receive from the application program a display command based on the application level-processing. The application programming interface may be configured to send the display command to the multi-touch display to adjust a display of a graphical element on the multi-touch display.

20 Claims, 3 Drawing Sheets

INTERACTIVE DISPLAY SYSTEM WITH CONTACT GEOMETRY INTERFACE

BACKGROUND

Computing devices with touch screens are capable of detecting objects in contact with the screen. Multi-touch displays are configured to sense and identify multiple contacts concurrently. Managing data about these contacts may be difficult for application programs executed on the computing devices. It may be difficult for an application program to ascertain a shape of a contact and to track changes in the shape of the contact over time. For example, if the contact is manipulated by a user, the contact location may change and the contact shape may change. As a result, the application program may consume significant processing resources acquiring and processing an image of the contact on the screen, and tracking changes to the image of the shape of the contact. For systems that track multiple contacts simultaneously, even greater processor resources can be consumed.

As a result of these challenges, developers may experience technical hurdles, delays, and cost overruns in developing application programs that are compatible with multi-touch screens, creating a barrier to market entry for new application programs. The quality and user experience of the resulting application programs may also vary. With such product development barriers, and potential varying quality of the resulting application programs, users may be reticent to adopt such touch screen devices in the future.

SUMMARY

An interactive display system with a contact geometry interface is disclosed. The interactive display system may include a multi-touch display, a touch detection system configured to detect a touch input on the multi-touch display and to generate contact geometry for a contact region of the touch input, and an application programming interface executed on a processor of the interactive display system. The application programming interface may be configured to receive the contact geometry and to send the contact geometry to a requesting application program for application-level processing. Further, the application programming interface may be configured to receive from the application program a display command based on the application level-processing. The application programming interface may be configured to send the display command to the multi-touch display to adjust a display of a graphical element on the multi-touch display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
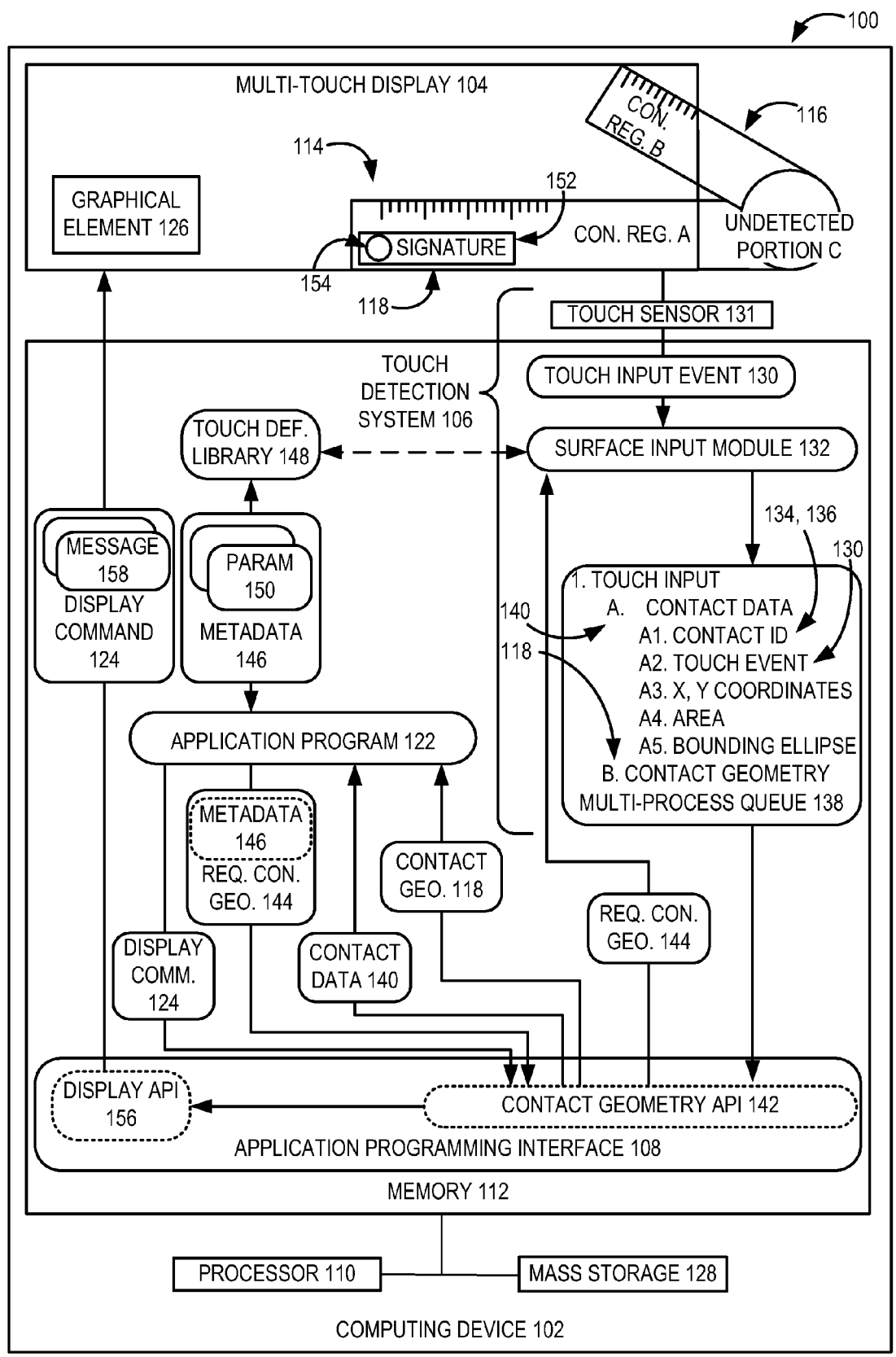
FIG. 1 is a schematic view of an embodiment of an interactive display system.

FIG. 1 schematically illustrates an embodiment of an interactive display system 100 configured for multi-touch input. Specifically, FIG. 1 shows a computing device 102 including a multi-touch display 104, a touch detection system 106, and an application programming interface 108 which may be stored on a mass storage device 128 and executed on a processor 110 using portions of memory 112.

Multi-touch display 104 is configured to receive multiple concurrent touch inputs 114 and to display one or more graphical elements 126 for viewing. In some embodiments, multi-touch display 104 may include a multi-touch input device and an output display positioned adjacent each other in an integrated unit, for example, an overlapping capacitive or resistive layer and liquid crystal display mounted in a shared housing. Alternatively, multi-touch display 104 may include a multi-touch input device and an output display that are housed in physically separate devices, such as a depth camera and a display in separate housings. As yet another alternative, the multi-touch input device and the output display may be housed in separate regions of a shared housing, for example, a display may be provided in a housing of an electronic device, with a multi-touch input device that only partially overlaps the display.

Touch detection system 106 is configured to detect a touch input 114 on multi-touch display 104. In FIG. 1, touch input 114 is schematically depicted as being made by an object 116, here shown as an adjustable ruler. It will be appreciated that object 116 may be another suitable object on or near multi-touch display 104, such as a drinking glass, a toy car, etc. Touch detection system 106 may be configured to detect touch input 114 using a suitable touch sensor 131, such as a resistive, capacitive, optical, or infrared touch sensor, for example.

Touch detection system 106 is also configured to generate a contact geometry 118 for a contact region A of touch input 114. Contact geometry 118 may include data indicating a perimeter of touch input 114. The perimeter may be approximated, for example, by a polyline. Contact geometry 118 also may include data indicating other aspects of touch input 114, such as a geometric center of the contact region, a vector or vector field associated with the contact region, etc.

According to one exemplary implementation, the touch detection system 106 may include one or more optical touch sensors, each configured to capture an image of contact region A associated with touch input 114 on multi-touch display 104. The captured image may be processed by an algorithm of touch detection system 106, which determines a path of pixels forming a contour of contact region A. The path may be converted by touch detection system 106 from pixel data to structured data in the form of contact geometry 118. In one example, contact geometry 118 may include an ordered list of points describing the path that forms the bounds of contact region A and/or an ordered list of two-dimensional geometric segments describing the path that forms the bounds of contact region A. It will be appreciated that such an ordered list of points and/or segments may be referred to as a polyline.

Application programming interface 108 is configured to receive contact geometry 118 from touch detection system 106 and to send contact geometry 118 associated with contact region A for touch input 114 to application program 122 for application-level processing. Application-level processing by application program 122 may be contrasted to operating-system-level processing by touch detection system 106, and may take several forms. For example, the contact geometry may be used by an application program to compute a use mode of the touch input so that the application program may generate a command for transmission via application programming interface 108 to touch detection system 106 to display content relevant to the use mode.

It will be appreciated that in the depicted embodiment the software components of the touch detection system 106 are operating-system-level components. The application programming interface 108 provides a software mechanism for the application program 122 to communicate with these operating system level software components. Thus, in one example, application programming interface 108 provides a convenient mechanism to send contact geometry 118 from the operating system software components of touch detection system 106 to application program 122.

In addition to sending contact geometry 118 to application program 122, application programming interface 108 may also receive commands generated by application program 122 responsive to application-level processing of contact geometry 118 to be forwarded to touch detection system 106. Thus, application programming interface 108 is further configured to receive from application program 122 a display command 124 based on the application-level processing, and to send display command 124 to multi-touch display 104 to adjust a display of a graphical element 126 on multi-touch display 104. In this manner, the application program may be informed of the specific contact geometry associated with a touch input, perform application-specific routines based on that contact geometry, and display output based on the result of those routines. This enables application programs to have greater awareness of touch input shapes, and flexibility to alter graphical user interface elements based on those shapes. As one specific example, the application program may use the results of application-level processing of the contact geometry to send a display command to the application programming interface such that graphical elements are not displayed in a way that would be obscured by the touch input. Thus, application program 122 may send a display command 124 to application programming interface 108 to display graphical element 126 to a side of object 116 so that graphical element 126 is not obscured by object 116.

As another example, if a 4×6 inch rectangle is placed on the touch display, the application program may recognize the object as a printed photograph and send a display command to draw an outline around the photograph, for example. As another example, the application program may recognize the object as a user's hand engaged in a gesture input, and may send a display command to display a graphical element that is manipulated during the gesture input, such as a slider, a dial, a keypad, etc.

Turning now to details of the process by which touch input is communicated from the multi-touch display to the application program, touch detection system 106 further comprises a surface input module 132 for receiving a touch input event 130 from touch sensor 131 associated with multi-touch display 104. Touch sensor 131 is configured to detect a touch input 114, which may be an initial touch, a movement of a touch, or a removal of a touch, for example. In response, the touch sensor 131 is configured to send a touch input event 130 indicating that the touch input 114 was detected, to the surface input module 132. It will be appreciated that touch input 114 may be detected by any suitable type of touch sensor 131, as described above.

Surface input module 132 is also configured to generate a contact identifier 134 that identifies touch input 114 touching multi-touch display 104 at contact region A responsive to touch input event 130. Contact identifier 134 may be a suitable distinctive identifier configured to identify touch input 114 and contact region A, and thereby enable the surface input module 132 and other software components to differentiate multiple concurrent touch inputs 114. In this manner, touch detection system 106 is configured to track changes to the contact geometry 118 of contact region A based on the associated contact identifier 134.

The touch detection system 106 may be configured to associate a plurality of contact regions with one touch input, which may be useful to identify multiple fingers of a user's hand as one touch input, or two separate portions of an object as one touch input, etc. Thus, contact region A may be one of a plurality of contact regions associated with a global contact identifier 136 shared by the regions, so that the plurality of contact regions may be tracked by touch detection system 106 based on global contact identifier 136. For example, FIG. 1 shows contact region A and contact region B of object 116 disposed on multi-touch display 104 and linked by an undetected portion C of object 116. Touch detection system 106 may track both contact regions A and B together through global contact identifier 136. Thus, contact regions A and B may be grouped as a one touch input even as manipulations to object 116 cause the shapes and orientations of contact regions A and B change.

The surface input module 132 may be configured to generate a data structure for contact data 140 about the corresponding contact region for each contact identifier. The contact data 140 data structure may include not only the contact ID, but also the touch event 130 (e.g., initial touch, movement, removal), spatial coordinates (e.g., x, y) for contact region A, an area of contact region A, and a bounding ellipse of contact region A. The contact data 140 data structure may be passed from the surface input module 132 and stored temporarily in a multi-process queue 138, for later retrieval by other processes, such as the application programming interface 108.

By associating contact data 140 with contact identifier 134, touch detection system 106 is configured to track changes to contact data 140 of contact region A based on contact identifier 134. If contact region A is one of a plurality of contact regions grouped with a global contact identifier 136, touch detection system 106 may associate contact data about each contact region of the plurality of contact regions with global contact identifier 136 as well.

Touch detection system 106 is also configured to detect interactions among the plurality of contact regions based on the respective contact identifiers. For example, if object 116 is an adjustable ruler, as one arm of the adjustable ruler is swiveled toward the other arm, contact region B and contact region A approach each other. Thus, touch detection system 106 may detect a change in an angle between adjacent boundaries of each contact and may display a graphical representation of the angle on multi-touch display 104. Further, a warning may be displayed indicating a potential collision between object 116 and another object disposed on multi-touch display 104 based on interactions detected between contact regions A and/or B and a contact region of the other object.

As indicated above, multi-process queue 138 is configured to relay contact data 140 and associated contact identifier 134 to contact geometry application programming interface 142, in the following manner. First, when an initial touch input event is detected, the multi-process queue 138 is configured to initially send contact data 140 to contact geometry application programming interface 142, which receives the contact data 140 and in turn sends the contact data 140 to application program 122.

Once the application program 122 has received the contact data 140, it may make a decision that it would like to receive the contact geometry 118 for the associated touch input. Thus, the application program may send a request for contact geometry 144 to the contact geometry application programming interface 142, which may receive the request for contact geometry 144 from application program 122. In turn the contact geometry application programming interface 142 may send the request for contact geometry 144 to the surface input module 132, which passes the request on to the multi-process queue 138. In response to receipt of the request for contact geometry 144, the multi-process queue 138 forwards the contact geometry 118 to the contact geometry application programming interface 142.

Request for contact geometry 144 may include touch input metadata 146 defining properties of touch input 114. In some embodiments, the touch input metadata may include one or more parameters 150 providing instructions on how the application program may receive the contact geometry. For example, contact geometry application programming interface 142 may be configured to send contact geometry 118 to application program 122 according to an update frequency parameter and/or to a contact geometry output format parameter included in touch input metadata 146.

Touch input metadata 146 may also include a global physical definition parameter of touch input 114 enabling touch detection system 106 to identify a physical characteristic of touch input 114 based on contact identifier 134 of contact region A. For example, the global physical definition parameter for object 116 may be an overall shape of object 116 (e.g., in the form of a two dimensional polyline or a three dimensional polygonal mesh), including a proxy contact geometry of undetected portion C. Thus, even though touch detection system 106 is unable to directly detect undetected portion C via touch sensor 131, touch detection system 106 may still be able to provide collision warnings and display graphical elements in a way that is not obscured by undetected portions of touch inputs. For example, touch detection system 106 may be able to calculate a center of geometry for contact region A of object 116 and, in combination with data about undetected portion C included in touch input metadata 146, determine whether it is likely that object 116 will fall off of multi-touch display 104.

Further, where contact region A is one of a plurality of contact regions associated with global contact identifier 136, the plurality of contact regions may be tracked by touch detection system 106 based on the global physical definition parameter of touch input metadata 146. For example, the global physical definition parameter may describe a size, shape, or configuration of object 116 may be available to the touch detection system via association with global contact identifier 136. Other types of global physical definition parameters may be included in the touch input metadata as well.

With such a global physical definition, touch detection system 106 may detect an interaction between portions of an object 116 such as the depicted adjustable ruler, which are not detected by touch detection system 106 and other detected touch inputs. For example, in the case that touch input metadata 146 includes a global physical definition parameter for the adjustable ruler describing a 3-D volume of the adjustable ruler, the touch detection system 106 may be able to detect the presence of an undetected portion C of the adjustable rule in the form of a pivot joint. Further, the touch detection system may be able to detect a collision between such an undetected portion C and another object, even though contact regions A and B may otherwise be remote from a contact region of the other object.

In some embodiments, a global physical definition parameter of touch input metadata 146 may describe a total physical area of object 116. For example, in the case that touch input metadata 146 includes a global physical definition parameter for the adjustable ruler describing a total physical area of the ruler, application program 122 may perform different application-level processing depending on whether a touch input is detected inside of or outside of the total physical area of the ruler, as projected onto the display. Thus, in one scenario, a touch input between contact regions A and B of the adjustable ruler, which may be included in the total physical area for the purposes of this example, may be ignored by application program 122. Further, in a second scenario, display command 124 may include a different message 158 depending on whether a concurrent touch input is detected inside of or outside of the total physical area. For example, a touch input between contact regions A and B of the adjustable ruler may lead to a presentation of a ruler setting user interface at multi-touch display 104 which enables a user to set the ruler units, markings, transparency, etc., on a graphically displayed ruler associated with the ruler object. Conversely, a touch input outside of the total physical area may not cause the ruler setting user interface to be presented.

Touch input metadata 146 may also be associated with contact identifier 134 or with global contact identifier 136 based on a signature 152 recognizable to the touch detection system. The signature 152 may provide a reference code allowing the touch detection system to look up the touch input metadata in a look-up table. Additionally or alternatively, the signature may provide a portion of the touch input metadata directly to the touch input system. In FIG. 1, touch input 114 includes a touch input signature 152 registered to touch input 114 for use with a vision-based touch detection system.

Vision-based touch detection systems may be configured to include an infrared light source directed at a surface of the multi-touch display. Infrared-reflective objects, including infrared-reflective tags, reflect a portion of the infrared light toward one or more image captured devices included in the touch detection system, which interprets the reflections as touch inputs to the multi-touch display. It will be appreciated that other signatures may be employed. For example, a signature may be configured to be recognized by radio frequency identification or optical character recognition.

The touch input signature 152 may be, for example, an infrared-reflective tag having a data region 154 encoding data about touch input 114. Infrared-reflective tags may include one or more data regions encoding data associated with the object bearing the tag. For example, data region 154 may provide spatial orientation information about object 116. It will also be appreciated that data region 154 may also encode all or a portion of touch input metadata 146 for object 116.

The touch input metadata may also be retrieved from a library of touch input metadata located in computing device 102 or on a remote server. FIG. 1 shows that touch input metadata 146 is retrieved by application program 122 from a touch input definition library 148 of touch detection system 106. Alternatively, the touch definition library may be accessed by the touch detection system, for example, via a function call made by the surface input module, as indicated in dashed lines. Touch input definition library 148 may be configured to include touch input metadata for one or more types of touch inputs that may be utilized by the application program 122. Touch input definition library 148 may be received from installation software for application program 122, for software included with touch input 114, from a remote server over a network, etc.

Contact geometry application programming interface 142 is configured to send contact geometry 118 to application program 122 for application-level processing. Contact geometry application programming interface 142 is also configured to receive a display command 124 based on the application-level processing from application program 122 and send display command 124 to a display application programming interface 156.

Display command 124 may include one or more messages 158 to display graphical element 126 on multi-touch display 104 so that graphical element 126 will not be visually obscured by an undetected portion of touch input 114 based on the global physical definition parameter. For example, if object 116 is a toy car having four wheels forming touch inputs on display 104 and also having a front bumper which is not detected by touch detection system 106, display command 124 may include a message to display a web page about the toy car so that the web page is not hidden from view by the front bumper.

Figure 2:
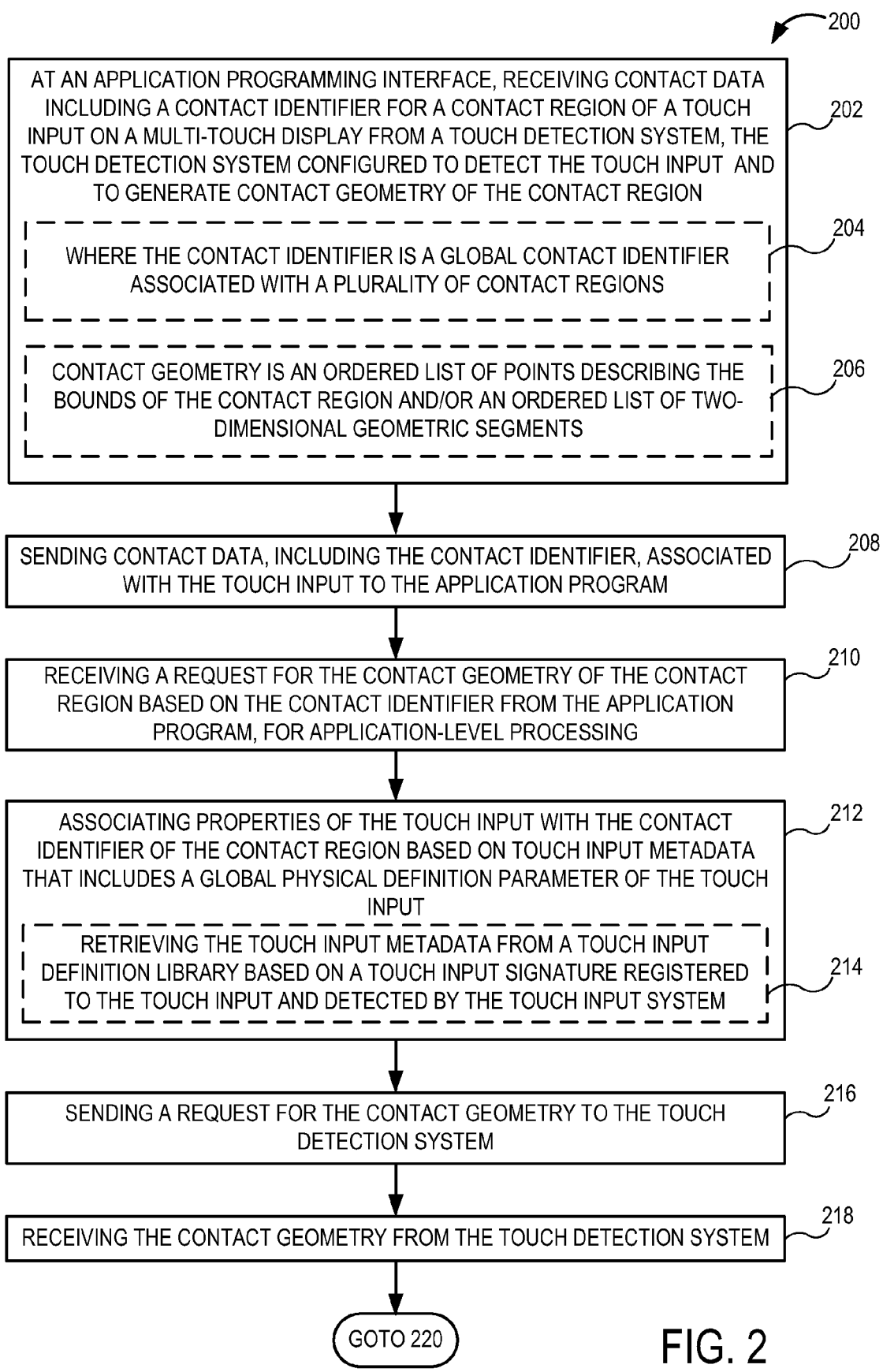
FIG. 2 is a flowchart of a method for displaying an image on an interactive display system.
Figure 3:
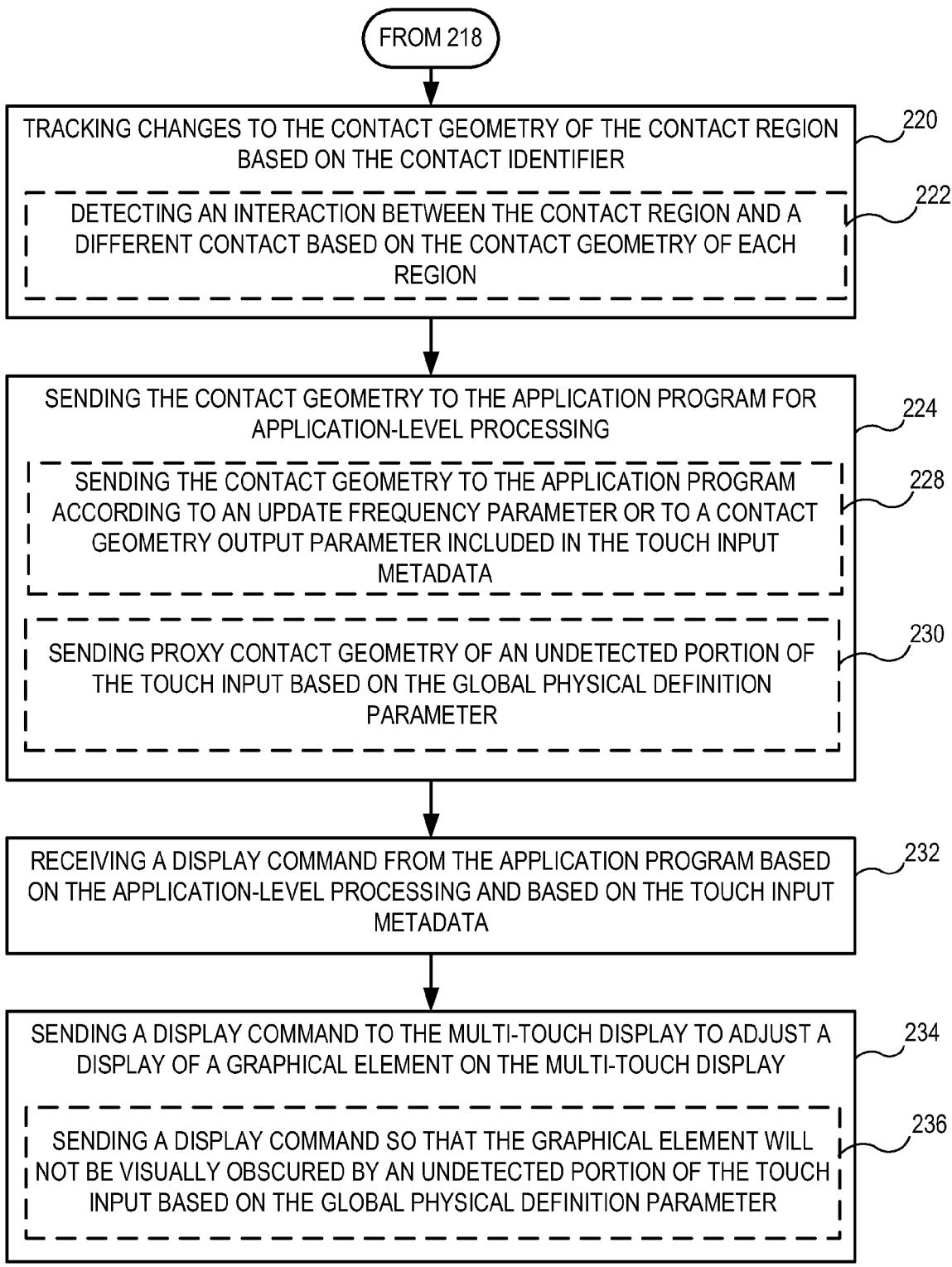
FIG. 3 is a continuation of the flowchart of FIG. 2.

Turning now to FIG. 2, a method 200 is depicted for displaying an image on a multi-touch display of an interactive display system. Method 200 may be executed using the hardware and software components described above in reference to FIG. 1, or using other suitable hardware and software components.

Method 200 includes, at step 202, at an application programming interface, receiving contact data including a contact identifier for a contact region of a touch input on a multi-touch display, from a touch detection system. As described above, the touch detection system may be configured to detect the touch input on the display and to generate contact geometry of the contact region. Further, the contact identifier may be configured to identify the touch input touching or near the display at the contact region.

As indicated at 204, the contact identifier may be a global contact identifier associated with a plurality of contact regions, as described above. As shown at 206, the contact geometry may be in the form of an ordered list of points describing the bounds of the contact region and/or an ordered list of two-dimensional geometric segments, or of another suitable format.

At step 208, the method may include sending contact data including the contact identifier associated with the touch input to the application program. At step 210, method 200 includes receiving a request for the contact geometry of the contact region based on the contact identifier from an application program, for application-level processing.

Continuing, method 200 includes, at 212, associating properties of the touch input with the contact identifier of the contact region based on touch input metadata that includes a global physical definition parameter of the touch input. Step 212 may further include, at 214, retrieving the touch input metadata from a touch input definition library based on a touch input signature registered to the touch input and detected by the touch detection system. Method 200 also includes, at 216, sending a request for the contact geometry to the touch detection system, and, at 218, receiving the contact geometry of the touch input to the multi-touch display from the touch detection system.

At 220, method 200 includes tracking changes to the contact geometry of the contact region based on the contact identifier. Step 220 may also include step 222, detecting an interaction between the contact region and a different contact region detected by the touch detection system based on the contact geometry of each contact region.

Continuing with method 200, at step 224, method 200 includes sending the contact geometry associated with the contact region for the touch input to a requesting application program for application-level processing.

Step 224 may also include, at step 228, sending the contact geometry to the application program according to an update frequency parameter or to a contact geometry output parameter included in the touch input metadata. Further, step 224 may also include, at step 230, sending proxy contact geometry of an undetected portion of the touch input based on the global physical definition parameter.

Method 200 also includes, at 232, receiving a display command from the application program based on the application-level processing and based on the touch input metadata. At 234, method 200 includes sending the display command to the multi-touch display to adjust a display of a graphical element on the multi-touch display. Step 234 may include, at step 236, sending a display command to display a graphical element on the multi-touch display so that the graphical element displayed will not be visually obscured by a portion of the touch input based on the global physical definition parameter.

It will be appreciated that the above described systems and methods may be used by application developers to provide awareness to application programs of contact geometries of touch inputs, and enable those application programs to adjust the display of graphical user interfaces in appropriate ways, by use of a convenient application programming interface. As a result, application programs that leverage such functionality may be more efficiently developed, and provide a user experience of enhanced quality.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It will be understood that the embodiments herein are illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. An interactive display system configured for multi-touch input, the interactive display system comprising:
   a multi-touch display;
   a touch detection system configured to detect a touch input on the multi-touch display and to generate a contact geometry for a contact region of the touch input and to detect a reflective tag associated with the touch input, the reflective tag encoding a touch input signature associated with touch input metadata defining one or more spatial properties about a portion of the touch input not detectable to the touch detection system; and
   an application programming interface executed on a processor of the interactive display system, the application programming interface being configured to receive the contact geometry from the touch detection system, to send the contact geometry associated with the contact region for the touch input to a requesting application program for application-level processing, to receive from the application program a display command based on the application level-processing, and to send the display command to the multi-touch display to adjust a display of a graphical element on the multi-touch display.

2. The interactive display system of claim 1, where the touch detection system generates a contact identifier that identifies the touch input touching the multi-touch display at the contact region.

3. The interactive display system of claim 2, where the touch detection system is configured to track changes to the contact geometry of the contact region based on the contact identifier.

4. The interactive display system of claim 2, where the contact region is one of a plurality of contact regions and where the touch detection system is configured to detect interactions among the plurality of contact regions based on the contact identifier.

5. The interactive display system of claim 1, where the contact geometry includes an ordered list of points describing the bounds of the contact region and/or an ordered list of two-dimensional geometric segments describing the bounds of the contact region.

6. The interactive display system of claim 1, where a request from the application program for the contact geometry associated with the contact region for the touch input to the application programming interface includes the touch input metadata.

7. The interactive display system of claim 1, where the application programming interface is configured to send the contact geometry to the application program according to an update frequency parameter or to a contact geometry output format parameter included in the touch input metadata.

8. The interactive display system of claim 1, where the touch input metadata is retrieved from a touch input definition library of the touch detection system.

9. The interactive display system of claim 1, where the reflective tag is an infrared-reflective tag having a data region encoding data about the touch input.

10. The interactive display system of claim 1, where the touch input metadata includes a global physical definition parameter of the touch input enabling the touch detection system to identify a physical characteristic of the touch input based on a contact identifier of the contact region.

11. The interactive display system of claim 10, where the contact region is one of a plurality of contact regions associated with a global contact identifier, so that the plurality of contact regions may be tracked by the touch detection system based on the global physical definition parameter of the touch input metadata.

12. The interactive display system of claim 11, where the display command sent by the application programming interface includes a message to display a graphical element on the multi-touch display so that the graphical element displayed will not be visually obscured by an undetected portion of the touch input based on the global physical definition parameter.

13. A method for displaying an image on a multi-touch display of an interactive display system, the method comprising:

receiving contact geometry of a contact region of a touch input by an object to the multi-touch display from a touch detection system;

sending the contact geometry associated with the contact region for the touch input to a requesting application program for application-level processing;

receiving touch input metadata from the application program, the touch input metadata including a global physical definition parameter defining a portion of the object not detectable by the multi-touch display;

receiving a display command from the application program based on the application-level processing; and sending the display command to the multi-touch display to adjust a display of a graphical element on the multi-touch display.

14. The method of claim 13, where the contact geometry is an ordered list of points describing the bounds of the contact region and/or an ordered list of two-dimensional geometric segments.

15. The method of claim 13, where sending the display command to the multi-touch display to adjust a display of a graphical element on the multi-touch display includes sending a display command to display a graphical element on the multi-touch display so that the graphical element displayed will not be visually obscured by a portion of the touch input based on the global physical definition parameter.

16. The method of claim 13, where sending the contact geometry to the application program includes sending a proxy contact geometry of an undetected portion of the touch input based on the global physical definition parameter.

17. The method of claim 13, further comprising:

receiving contact data including a contact identifier that identifies the touch input touching the display at the contact region from the touch detection system;

tracking changes to the contact geometry of the contact region based on the contact identifier, including detecting an interaction between the contact region and a different contact region detected by the touch detection system based on the contact geometry of each contact region; and associating properties of the touch input with the contact identifier of the contact region based on the touch input metadata.

18. The method of claim 17, where the contact identifier is a global contact identifier associated with a plurality of contact regions.

19. The method of claim 17, where associating properties of the touch input with a contact identifier includes retrieving the touch input metadata from a touch input definition library based on a touch input signature registered to the touch input and detected by the touch detection system.

20. A method for displaying an image on a multi-touch display of an interactive display system, the method comprising:

receiving contact data including a contact identifier for a contact region of a touch input at the display from a touch detection system, the touch detection system configured to detect a touch input by an object on the display and to generate contact geometry of the contact region;

receiving a request for the contact geometry of the contact region based on the contact identifier from an application program for application-level processing, the request including touch input metadata for the touch input, the touch input metadata including a global physical definition parameter defining a portion of the object not detectable by the multi-touch display;

associating properties of the touch input with the contact identifier based on the touch input metadata of the touch input;

receiving the contact geometry from the touch detection system;

sending the contact geometry to the application program for application-level processing;

receiving a display command from the application program based on the application-level processing and based on the touch input metadata; and sending a display command to the multi-touch display to adjust a display of a graphical element on the multi-touch display.

* * * * *